(12) United States Patent
Chen et al.

(10) Patent No.: US 11,481,084 B2
(45) Date of Patent: Oct. 25, 2022

(54) MULTI-WINDOW SWITCHING METHOD AND SWITCHING SYSTEM

(71) Applicant: Aten International Co., Ltd., New Taipei (TW)

(72) Inventors: Hao-Jun Chen, New Taipei (TW); Bo-Jyun Chen, Taoyuan (TW)

(73) Assignee: Aten International Co., Ltd., New Taipei (TW)

( * ) Notice: Subject to any disclaimer, the term of this patent is extended or adjusted under 35 U.S.C. 154(b) by 0 days.

(21) Appl. No.: 17/314,051

(22) Filed: May 7, 2021

(65) Prior Publication Data
US 2021/0382603 A1 Dec. 9, 2021

(30) Foreign Application Priority Data
Jun. 4, 2020 (TW) .................................. 109118759

(51) Int. Cl.
*G06F 3/0481* (2022.01)
*G06F 3/04812* (2022.01)

(52) U.S. Cl.
CPC ................. *G06F 3/04812* (2013.01)

(58) Field of Classification Search
CPC .................................................. G06F 3/04812
See application file for complete search history.

(56) References Cited

U.S. PATENT DOCUMENTS

| | | | | |
|---|---|---|---|---|
| 5,874,936 A * | 2/1999 | Berstis | .......... | G06F 3/0485 715/788 |
| 6,211,879 B1 * | 4/2001 | Soohoo | .......... | G06F 3/0485 715/854 |
| 7,302,650 B1 * | 11/2007 | Allyn | .......... | G06F 3/04812 715/792 |
| 8,943,410 B2 * | 1/2015 | Ubillos | .......... | G06F 3/0481 715/838 |
| 10,929,083 B2 * | 2/2021 | Wang | .......... | G06F 3/03543 |

(Continued)

FOREIGN PATENT DOCUMENTS

| | | |
|---|---|---|
| CN | 107463518 | 12/2017 |
| TW | 201505000 | 2/2015 |
| TW | 201931073 | 8/2019 |

OTHER PUBLICATIONS

"Office Action of Taiwan Counterpart Application", dated May 13, 2021, p. 1-p. 6.

*Primary Examiner* — Daeho D Song
(74) *Attorney, Agent, or Firm* — JCIPRNET

(57) ABSTRACT

A multi-window switching method and a switching system are provided. The multi-window switching method includes following steps: displaying a first window screen provided via a first computer device and a second window screen provided via a second computer device, wherein a first screen boundary of the first window screen is adjacent to a second screen boundary of the second window screen; receiving a control signal provided by an input device to control a position of a cursor on the first window screen or the second window screen; calculating a first moving speed of the input device when the cursor touches the first screen boundary in the first window screen; and determining whether the first moving speed is greater than or equal to a preset speed threshold to decide whether the cursor is displayed in the second window screen.

20 Claims, 11 Drawing Sheets

(56) References Cited

U.S. PATENT DOCUMENTS

| | | | |
|---|---|---|---|
| 2002/0126155 A1* | 9/2002 | Lin-Hendel | G06F 3/04817 715/785 |
| 2006/0038741 A1* | 2/2006 | Mori | G06F 3/0481 345/1.1 |
| 2006/0080621 A1* | 4/2006 | Park | G06F 3/04883 715/788 |
| 2009/0256840 A1* | 10/2009 | Varadhan | G06T 15/20 345/419 |
| 2011/0047306 A1* | 2/2011 | Dickens | G06F 3/038 710/73 |
| 2014/0019652 A1* | 1/2014 | Soffer | G06F 21/82 710/73 |
| 2015/0002397 A1* | 1/2015 | Song | G06F 3/038 345/163 |
| 2015/0022360 A1* | 1/2015 | Chen | G16Z 99/00 340/573.1 |
| 2016/0103582 A1* | 4/2016 | Abe | G06F 3/0481 345/157 |
| 2017/0351396 A1* | 12/2017 | Passeri | G06F 3/038 |
| 2017/0351471 A1* | 12/2017 | Passeri | G06F 3/1438 |
| 2017/0351472 A1* | 12/2017 | Passeri | G09G 5/12 |
| 2017/0351629 A1* | 12/2017 | Passeri | G06F 13/4022 |
| 2017/0353549 A1* | 12/2017 | Passeri | G06F 1/1698 |
| 2019/0377472 A1* | 12/2019 | Naylor | G06F 3/1423 |

\* cited by examiner und is greater than or equal to a preset speed threshold to decide whether the cursor is displayed in the second window screen.

MULTI-WINDOW SWITCHING METHOD AND SWITCHING SYSTEM

CROSS-REFERENCE TO RELATED APPLICATION

This application claims the priority benefit of Taiwan application no. 109118759, filed on Jun. 4, 2020. The entirety of the above-mentioned patent application is hereby incorporated by reference herein and made a part of this specification.

TECHNICAL FIELD

The invention relates to a switching technology for multi-window display, and in particular to a switching technology for conditionally controlling multi-window display.

BACKGROUND

A general keyboard-screen-mouse (KVM) switch can control more than two computers with a set of input device and display device. The user may select one of the computers by switching the KVM switch to display and control one corresponding window screen. However, with the evolution of application requirements, the current main method is to display multiple window screens on the display device at the same time, so as to achieve the effect that the user can simultaneously monitor window screens, or the effect that multiple display devices can be combined into one screen display. In practice, when operating the general KVM for switching between a plurality of computers, the user still needs to manually perform the switching (e.g., operating buttons), or operate the mouse to move to perform the switching.

However, when the mouse is actually operated to perform the switching, false operations can be easily occurred between the two window boundaries. For example, assuming that the user does not wish to switch between windows, but accidentally moves the cursor to touch the boundary between the two windows, so that the switching process will then be activated. If the cursor is moved back immediately, more processing time is required to switch back to the original window.

In view of the above, the existing operation of KVM switch is quite inconvenient for the user, and thus good user experience cannot be provided during a multi-window screen display. Therefore, several solutions are provided in the following embodiments.

SUMMARY

The invention provides a multi-window switching method and a switching system, which can provide one single cursor to move between window screens and achieve the effect of conditional switching.

The multi-window switching method of the invention includes: displaying a first window screen provided via a first computer device and a second window screen provided via a second computer device, wherein a first screen boundary of the first window screen is adjacent to a second screen boundary of the second window screen; receiving a control signal provided by an input device to control a position of a cursor on the first window screen or the second window screen; calculating a first moving speed of the input device when the cursor touches the first screen boundary in the first window screen; and determining whether the first moving The switching system of the invention includes a switch device, a display device, a first computer device, a second computer device and an input device. The display device is coupled to the switch device. The display device at least includes a first window screen and a second window screen. The first computer device is coupled to the switch device. The first computer device provides first display data to the first window screen of the display device via the switch device. The second computer device is coupled to the switch device. The second computer device provides second display data to the second window screen of the display device via the switch device. The first screen boundary of the first window screen is adjacent to a second screen boundary of the second window screen. The input device is coupled to the switch device. The input device provides a control signal via the switch device to control a position of a cursor on the display device. When the switch device determines that the cursor touches the first screen boundary in the first window screen, the switch device calculates a first moving speed of the input device. The switch device determines whether the first moving speed is greater than or equal to a preset speed threshold to decide whether to switch the cursor from the first window screen to be displayed in the second window screen.

Based on the above, the multi-window switching method and the switching system of the invention can provide the switching method with conditional limitations. As a result, the user may be prevented from a false switching or a false blocking when switching between windows, and the switching threshold may be automatically adjusted when switching between windows according to the user's habit for operating the mouse to provide good use experience.

DETAILED DESCRIPTION

Figure 1:
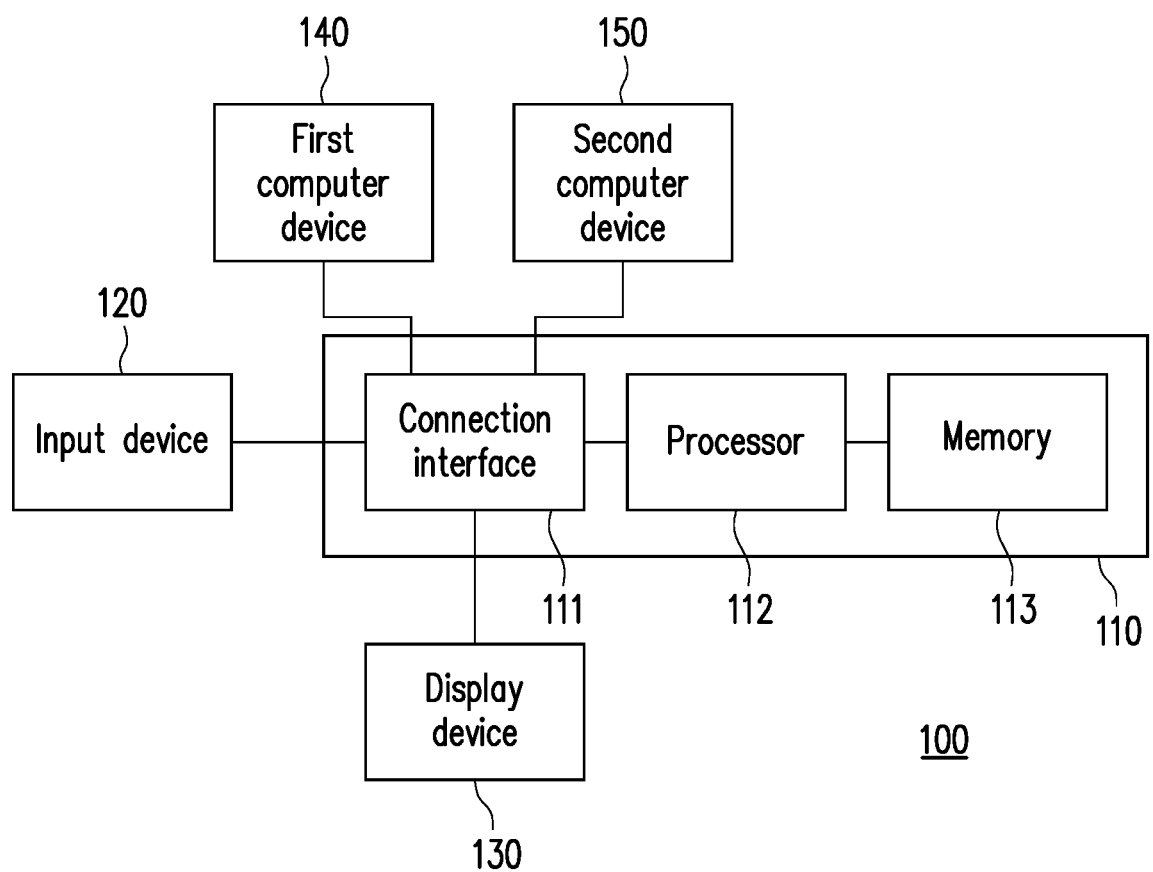
FIG. 1 is a schematic diagram of a switching system according to an embodiment of the invention.

In order to make content of the invention more comprehensible, embodiments are described below as the examples to prove that the invention can actually be realized. Moreover, elements/components/steps with same reference numerals represent same or similar parts in the drawings and embodiments.

FIG. 1 is a schematic diagram of a switching system according to an embodiment of the invention. Referring to FIG. 1, a switching system 100 includes a switch device 120, an input device 120, a display device 130, a first computer device 140 and a second computer device 150. The switch device 110 includes a connection interface 111, a processor 112 and a memory 113. The connection interface 111 includes a plurality of physical connection ports, and is coupled to the input device 120, the display device 130, the first computer device 140 and the second computer device 150 through the physical connection ports and a plurality of connection lines. The input device 120 may be, for example, a mouse, a touch pad or a trackball, and the invention is not limited thereto. In this embodiment, the first computer device 140 and the second computer device 150 can provide a first display screen and a second display screen to the display device 130 via the switch device 110, respectively, so that the display device 130 can simultaneously display a multi-window screen. In another embodiment, the display device 130 comprises a first display device and a second display device, so that the first display screen from the first computer device 140 and the second display screen from the second computer device 150 can be respectively provided to the first display device and the second display device via the switch device 110. Therefore, the number of display devices is not limited here.

In this embodiment, the switch device 110 may be, for example, a keyboard-screen-mouse (KVM) switch, but the invention is not limited thereto. The display device 130 can simultaneously display the first display screen and the second display screen respectively corresponding to different operation programs, and the user may operate the input device 120 to move a cursor corresponding to the input device 120 between the first display screen and the second display screen respectively correspond to different operation programs. In other words, the user may switch between the two operation programs of the first computer device 140 and the second computer device 150 through one single input device 120. However, the number of computer devices and the number of window screens of the invention are not limited to the description of this embodiment and FIG. 1. In an embodiment, the switch device 110 may also be coupled to more computer devices, and may simultaneously display more window screens through the display device 130.

In this embodiment, the processor 112 may be, for example, a central processing unit (CPU) or other programmable devices for general purpose or special purpose such as a microprocessor and a digital signal processor (DSP), an application specific integrated circuit (ASIC), a programmable logic device (PLD), other similar processing circuits or a combination of these devices. The processor 112 may include related circuits for implementing various embodiments of the invention, and the memory 113 may store related programs, modules, or algorithms for implementing various embodiments of the invention for the processor 112 to read and execute. In addition, the processor 112 may also perform arithmetic functions and write data into the memory 113.

In an embodiment, the processor 112 may, for example, execute a trace queue module, a speed calculation module, and a timer module. The processor 112 may record position information or amount of movement information of the input device 120 within a period of time prior to a current time into a track queue. When the cursor touches a screen boundary, the processor 112 may execute the speed calculation module according to the position information and the amount of movement information recorded in the tack queue to calculate a moving speed of the input device 120 which can be used in subsequent switching determinations. In another embodiment, the processor 112 may also execute a distance register and a timer to accumulate an amount of movement within a specific time period for calculating the moving speed of the input device 120.

It should be noted that, a calculation method of the moving speed of the input device 120 according to each embodiment of the invention may be, for example, the amount of movement of the input device 120 within a preset time length divided by the preset time length. Here, the amount of movement may be, for example, a movement trace length of the mouse, a movement trace length of a gesture sensed by the touch pad, or a rotation trace length of the trackball. The invention is not limited in this regard. In addition, the processor 112 can also execute a cursor determination module for preventing false switching or false blocking, and the detailed implementation means regarding the same will be described below with reference to various embodiments.

Figure 2:
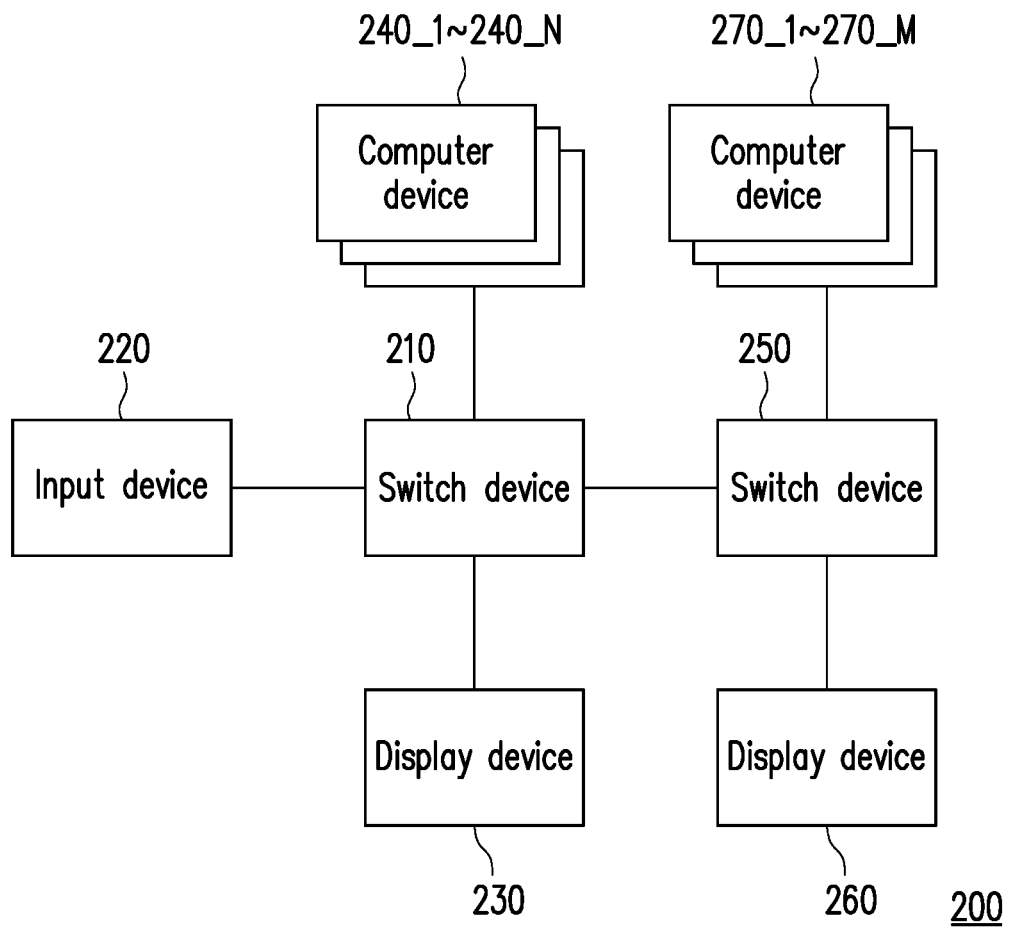
FIG. 2 is a schematic diagram of a switching system according to another embodiment of the invention.

FIG. 2 is a schematic diagram of a switching system according to another embodiment of the invention. Referring to FIG. 2, a switch system 200 includes switch devices 210 and 250, an input device 220, display devices 230 and 260, and computer devices 240_1 to 240_N and 270_1 to 270_M, wherein N and M are positive integers greater than 0. The switch device 210 is coupled to the input device 220, the display device 230 and the computer devices 240_1 to 240_N. The switch device 250 is coupled to the switch device 210, the display device 260, and the computer devices 270_1 to 270_M. In this embodiment, the computer devices 240_1 to 240_N may respectively provide a plurality of display screens to the display device 230 via the switch device 210, so that the display device 230 can simultaneously display multiple window screens. The computer devices 270_1 to 270_M may respectively provide a plurality of display screens to the display device 260 via the switch device 250, so that the display device 260 can simultaneously display other multiple window screens. In other words, the switch device 210, the display device 230, and the computer devices 240_1 to 240_N may form a subsystem. The switch device 250, the display device 260, and the computer devices 270_1 to 270_M may form another subsystem. Moreover, the two subsystems can share one input device 220. The input device 220 is capable of switching between the switch devices 210 and 250 for operation according to a user manually setting or a system automatic determination.

In this embodiment, each of the switch devices 210 and 250 may be a keyboard-screen-mouse switch, and include the internal circuit components of the switch device 110 of the embodiment of FIG. 1 described above. In this regard, the display device 230 may display multiple display screens of different operation programs respectively provided by the computer devices 240_1 to 240_N, and the display device 260 may display other display screens of different operation programs respectively provided by the computer devices 270_1 to 270_M. In this embodiment, the user may operate the input device 220 to move the cursor between the display screens in the multi-window screens respectively corresponding to the display devices 230 and 260. In other words, the user may switch and operate between multiple operations programs in the subsystems through one single input device 220. However, the number of subsystems of the invention is not limited to that shown in FIG. 2. In an embodiment, the switch device 210 may be used as a master switch device; the switch device 250 may be used as a slave switch device; and the switching system 200 may further include multiple slave switch devices connected in series.

For example, the switching system 200 may be applied to a TV wall. The TV wall may provide a wide range of display effects by combining the screens of the display devices 230 and 260. Moreover, the display devices 230 and 260 may separately receive display signals of the display screens respectively provided by the computer devices 240_1 to 240_N and the computer devices 270_1 to 270_M, so as to display a plurality of window screens simultaneously or in combination through the display devices 230 and 260. In addition, enough teaching, suggestion, and implementation regarding other implementation details and device features of the input device 220, the switch devices 210 and 250 of this embodiment may be obtained from the foregoing embodiment of FIG. 1, and thus related descriptions thereof are not repeated hereinafter. In addition, at least one of the switch devices 210 and 250 may also perform the function for preventing the cursor false switching and the cursor false blocking as the switch device 110 of FIG. 1, and detailed implementation means regarding the same will be described in detail with reference to various embodiments below.

In addition, it should be noted that, the multiple window screens described in some embodiments of the invention may indicate that one display device is operated to display the multiple window screens simultaneously in one display screen of the one display device, and display data of the multiple window screens are respectively provided by different computer devices. The one display screen may also refer to one display interface. For example, as shown in FIG. 1, the display device 130 may display two window screens simultaneously in one display screen, and display data of the two window screens are respectively provided by the first computer device 140 and the second computer device 150. Alternatively, the window screens described in some embodiments of the invention may indicate that multiple display device are operated to one by one display the multiple window screens simultaneously in corresponding multiple display screens, and display data of the multiple window screens are respectively provided by different computer devices. For example, as shown in FIG. 2, the display device 230 may display one window screen according to display data provided by the computer device 240_1, and the display device 260 may simultaneously display another one window screen according to another display data provided by the computer device 270_1.

Figure 3:
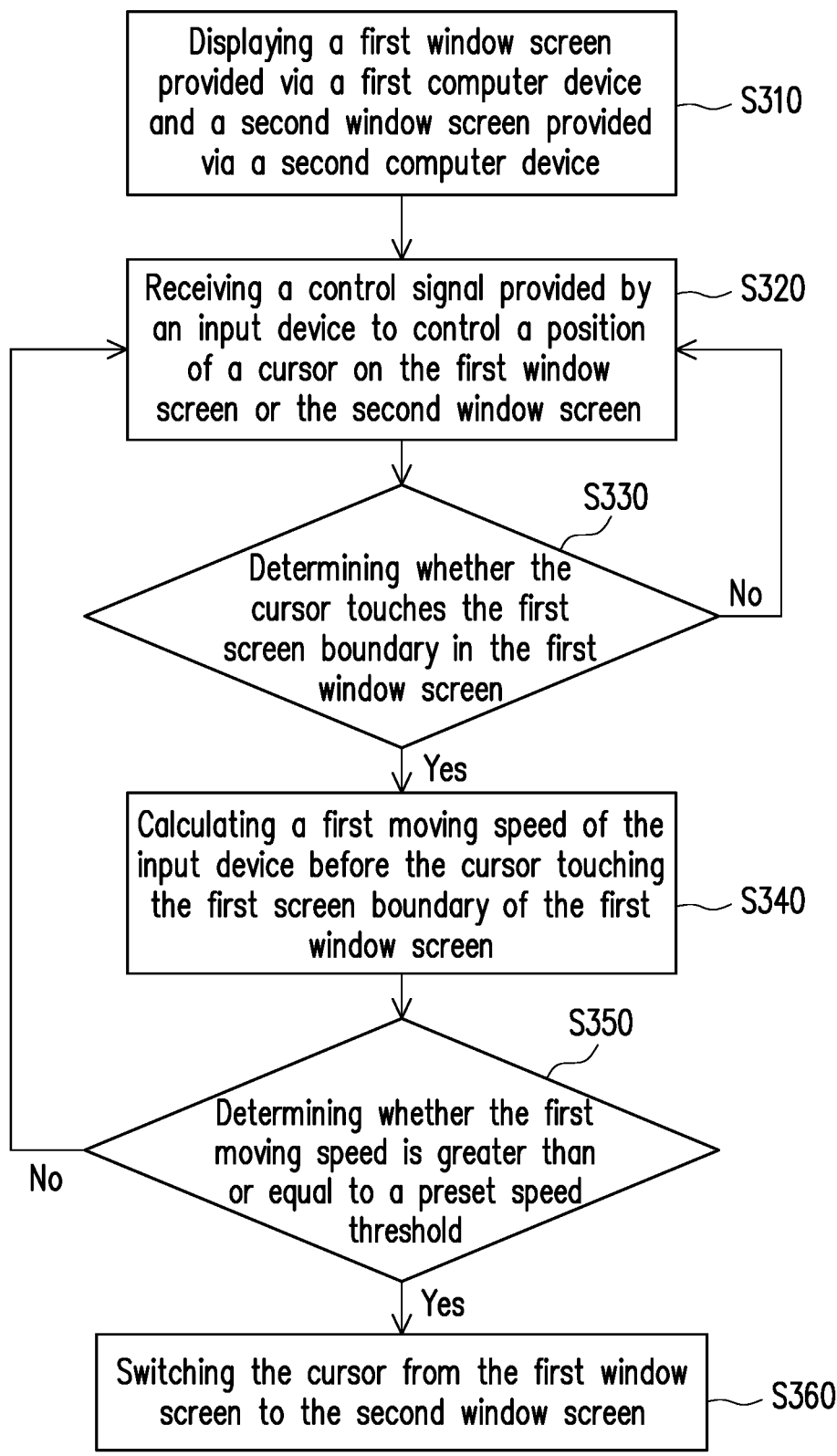
FIG. 3 is a flowchart of a multi-window switching method according to an embodiment of the invention.
Figure 4A:
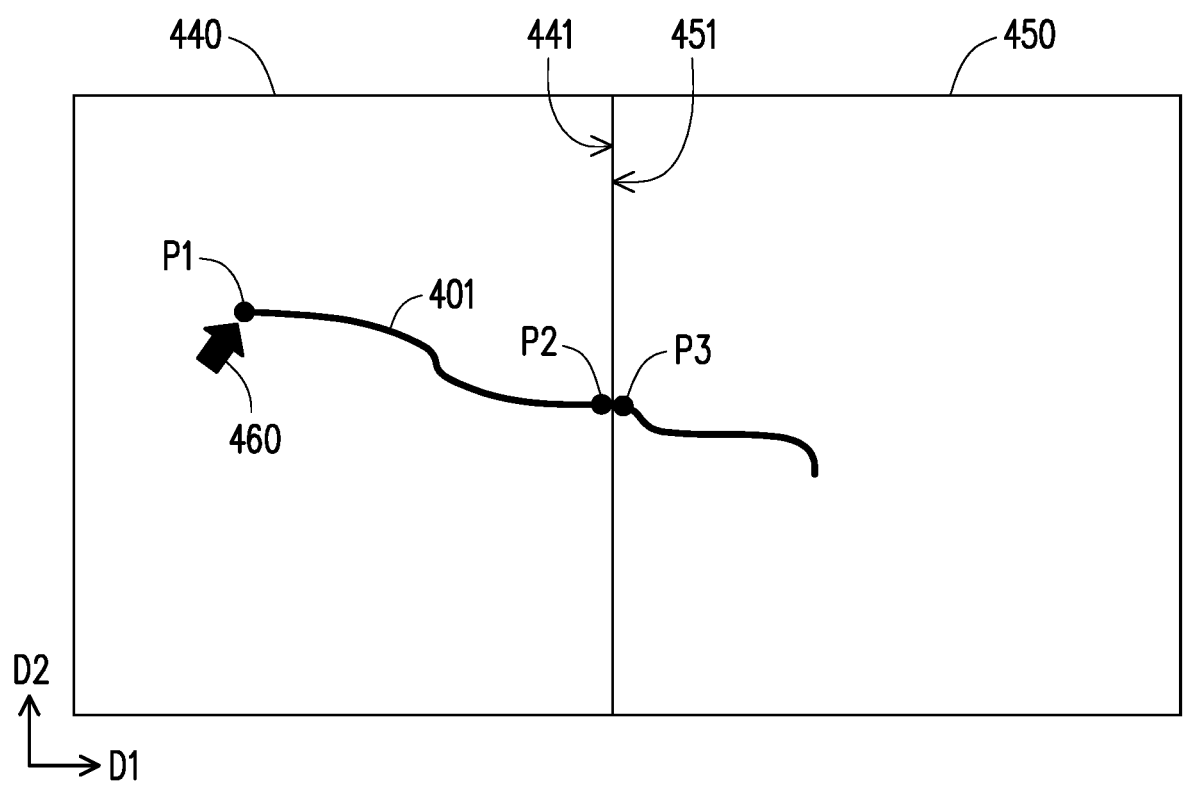
FIG. 4A is an exemplary schematic diagram for switching a cursor displayed in a multi-window screen in the embodiment of FIG. 3 of the invention.

FIG. 3 is a flowchart of a multi-window switching method according to an embodiment of the invention. FIG. 4A is an exemplary schematic diagram for switching a cursor displayed in a multi-window screen in the embodiment of FIG. 3 of the invention. Referring to FIG. 1, and FIG. 3 to FIG. 4A, a multi-window switching method of this embodiment is at least applicable to the switching system 100 of the embodiment of FIG. 1. In FIG. 4A, a first window screen 440 is horizontally adjacent to a second window screen 450. In step S310, the display device 130 displays the first window screen 440 provided via the first computer device 140 and the second window screen 450 provided via the second computer device 150. Here, a first screen boundary 441 of the first window screen 440 is adjacent to a second screen boundary 451 of the second window screen 450. In step S320, the switch device 110 receives a control signal provided by the input device 120 to control a position of a cursor 460 on the first window screen 440 or the second window screen 450. For example, as shown in FIG. 4A, the cursor 460 may first be moved in the first window screen 440.

In step S330, the switch device 110 determines whether the cursor 460 touches the first screen boundary 441 in the first window screen 440. If not, the switch device 110 continues to execute step S320, so as to continue receiving the control signal provided by the input device 120 to move the cursor 460 in the first window screen 440. If yes, the switch device 110 executes step S340. In step S340, the switch device 110 calculates a first moving speed of the input device 120 before the cursor 460 touching the first screen boundary 441. Here, the first moving speed is an average speed. In this embodiment, as shown in FIG. 4A, when the cursor 460 is moved from a position P1 to a position P2 of the first screen boundary 441 along a trace 401, the processor 112 may obtain the first moving speed by calculating a first amount of movement of the input device 120 in a first direction within a first preset time length before the cursor 460 touching the first screen boundary 441 divided by the first preset time length. It should be noted that, the first direction refers to a direction in which the cursor 460 is correspondingly moved along a horizontal direction D1 of the display screen in response to the input device 120 controlled or moved by the user.

In step S350, the switch device 110 determines whether the first moving speed is greater than or equal to a preset speed threshold. If not, the switch device 110 does not perform the switching and continues to execute step S320, so as to continue receiving the control signal provided by the input device 120 to move the cursor 460 in the first window screen 440. In this regard, the switch device 110 determines that the user does not wish to move the cursor 460 to the second window screen 450, and therefore does not perform the switching. If yes, the switch device 110 executes step S360. In step S360, the switch device 110 performs the switching, so as to switch the cursor 460 from the first window screen 440 to the second window screen 450. In this embodiment, the switch device 110 switches the input device 120 from the first computer device 140 to be connected to the second computer device 150. For example, as shown in FIG. 4A, the cursor 460 is switched to be displayed on a position P3 of the second screen boundary 451 of the second window screen 450, so that the cursor 460 may continue to be correspondingly moved in the second window screen 450 in response to the input device 120 moved or controlled by the user. Therefore, the multi-window switching method of this embodiment may provide a good cursor display switching function in the horizontal direction D1.

However, it is worth noting that the preset speed threshold is an initial speed threshold Vth0. Further, on the premise that a time interval at which the processor 112 calculates the first moving speed (the average speed) is 0.1 second, the initial speed threshold Vth0 may, for example, satisfy Equation (1) below, wherein W is the number of pixels in the horizontal direction D1 of the window screen. In this regard, if the cursor 460 is moved by a distance more than or equal to one-fifth the number of pixels in the horizontal direction D1 of the first window frame 440 within 0.1 second and touches the first frame boundary 441, the processor 112 then determines that the first moving speed is greater than or equal to the initial speed threshold Vth0.

$$Vth0=(w\times(\tfrac{1}{5}))/0.1 \quad \text{Equation (1)}$$

In addition, with respect to an obtaining method of the first moving speed, in an embodiment, the processor 112 may execute the trace queue module to record a plurality of track data of the cursor in a past period of time, and calculate the trace data to obtain an average moving speed in the past period of time as the first moving speed (which is not limited to be obtained by calculating the amount of movement divided by the time length as described above). In this regard, the processor 112 may create a trace data content of the trace queue as shown in Table 1 below, and store the trace queue in the memory 113. In Table 1 below, the number of data storable in the trace queue may be, for example, 6, and the processor 112 may store the 6 trace data in Table 1 in sequence according to time. X in the track data is a moved distance of the cursor 460 in the horizontal direction D1, and Y is a moved distance of the cursor 460 in a vertical direction D2, wherein the units of X and Y are pixels.

TABLE 1

| Number | Trace data (X(pixel), Y(pixel), time(ms)) |
| --- | --- |
| 1st | (5, 10, 850) |
| 2nd | (10, 5, 900) |
| 3rd | (20, 20, 1000) |
| 4th | (30, 10, 1030) |
| 5th | (15, 10, 1090) |
| 6th | (10, 5, 1100) |

For instance, after the processor 112 records the 6th trace data (10, 5, 1100) in Table 1 above, if the processor 112 determines that the cursor 460 touches the position P2 of the first screen boundary 441, the processor 112 then calculates, for example, the moving speed of the cursor 460 in the horizontal direction D1 within the past 0.1 second (3rd to 6th data). In this regard, the processor 112 may perform a calculation of (20+30+15+10)/0.1=750 (pixel/sec). Therefore, the first moving speed is 750 (pixel/sec). It should be noted that, the processor 112 may delete the oldest trace data (1st and 2nd data), so that the trace queue can free up space to be able to continue to store the next trace data (7th data). In addition, the method of calculating the moving speed above may also be applied to calculations of the first moving speed, a second moving speed and a third moving speed described in the following embodiments of the invention.

Figure 4B:
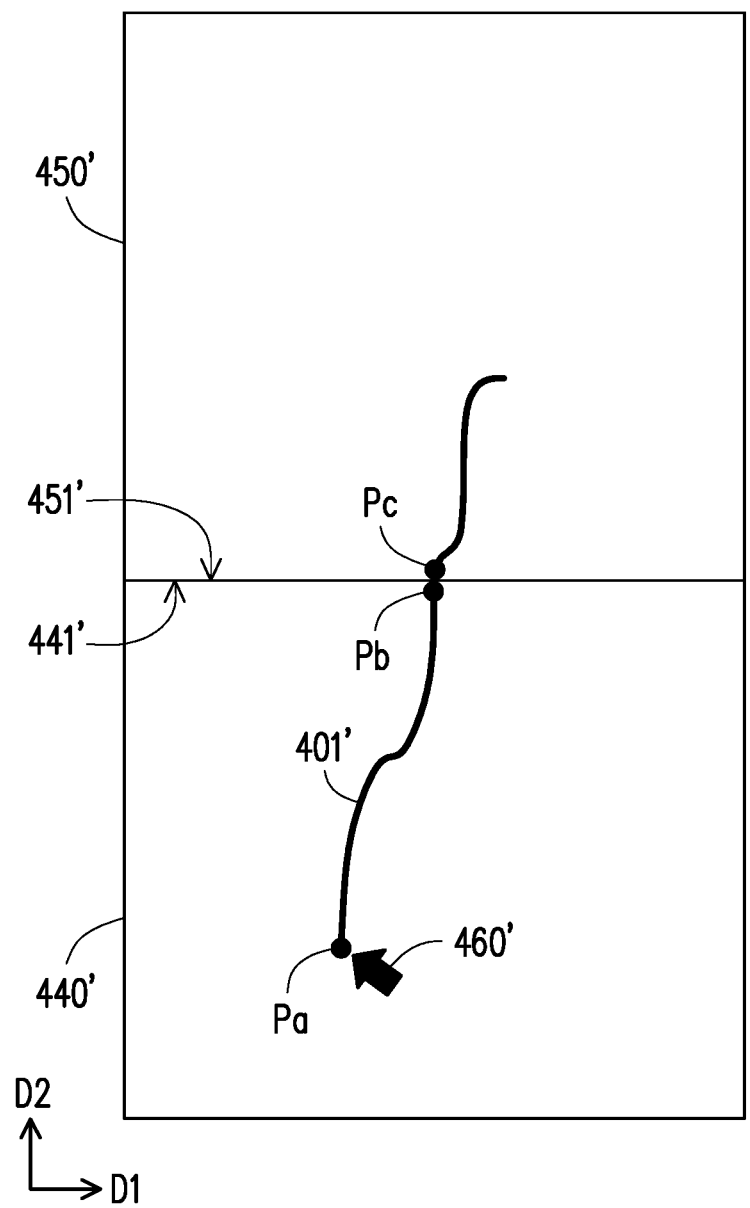
FIG. 4B is another exemplary schematic diagram for switching a cursor displayed in a multi-window screen in the embodiment of FIG. 3 of the invention.

FIG. 4B is another exemplary schematic diagram for switching a cursor displayed in a multi-window screen in the embodiment of FIG. 3 of the invention. In an embodiment, a first window screen 440' may be vertically adjacent to a second window screen 450', and the process of the embodiment of FIG. 3 may be equally applicable here. In step S310, the display device 130 displays the first window screen 440' provided via the first computer device 140 and the second window screen 450' provided via the second computer device 150. Here, a first screen boundary 441' of the first window screen 440' is adjacent to a second screen boundary 451' of the second window screen 450'. In step S320, the switch device 110 receives a control signal provided by the input device 120 to control a position of a cursor 460' on the first window screen 440' or the second window screen 450'. For example, as shown in FIG. 4B, the cursor 460' may first be moved in the first window screen 440'.

In step S330, the switch device 110 determines whether the cursor 460' touches the first screen boundary 441' in the first window screen 440'. If not, the switch device 110 continues to execute step S320, so as to continue receiving the control signal provided by the input device 120 to move the cursor 460' in the first window screen 440'. If yes, the switch device 110 executes step S340. In step S340, the switch device 110 calculates a first moving speed of the input device 120 before the cursor 460' touching the first screen boundary 441'. In this embodiment, as shown in FIG. 4B, when the cursor 460' is moved from a position Pa to a position Pb of the first screen boundary 441' along a trace 401', the processor 112 may obtain the first moving speed by calculating a first amount of movement of the input device 120 in a second direction within a first preset time length before the cursor 460' touching the first screen boundary 441' divided by the first preset time length. It should be noted that, the second direction refers to a direction in which the cursor 460' is correspondingly moved along the vertical direction D2 of the display screen in response to the input device 120 controlled or moved by the user.

In step S350, the switch device 110 determines whether the first moving speed is greater than or equal to a preset speed threshold. If not, the switch device 110 does not perform the switching and continues to execute step S320, so as to continue receiving the control signal provided by the input device 120 to move the cursor 460' in the first window screen 440'. In this regard, the switch device 110 determines that the user does not wish to move the cursor 460' to the second window screen 450', and therefore does not perform the switching. If yes, the switch device 110 executes step S360. In step S360, the switch device 110 performs the switching, so as to switch the cursor 460' from the first window screen 440' to the second window screen 450'. In this embodiment, the switch device 110 switches the input device 120 from the first computer device 140 to be connected to the second computer device 150. For example, as shown in FIG. 4B, the cursor 460 is switched to be displayed on a position Pc of the second screen boundary 451' of the second window screen 450', so that the cursor 460' may continue to be correspondingly moved in the second window screen 450' in response to the input device 120 moved or controlled by the user. Therefore, the multi-window switching method of this embodiment may provide a good cursor display switching function in the vertical direction D2.

Figure 5:
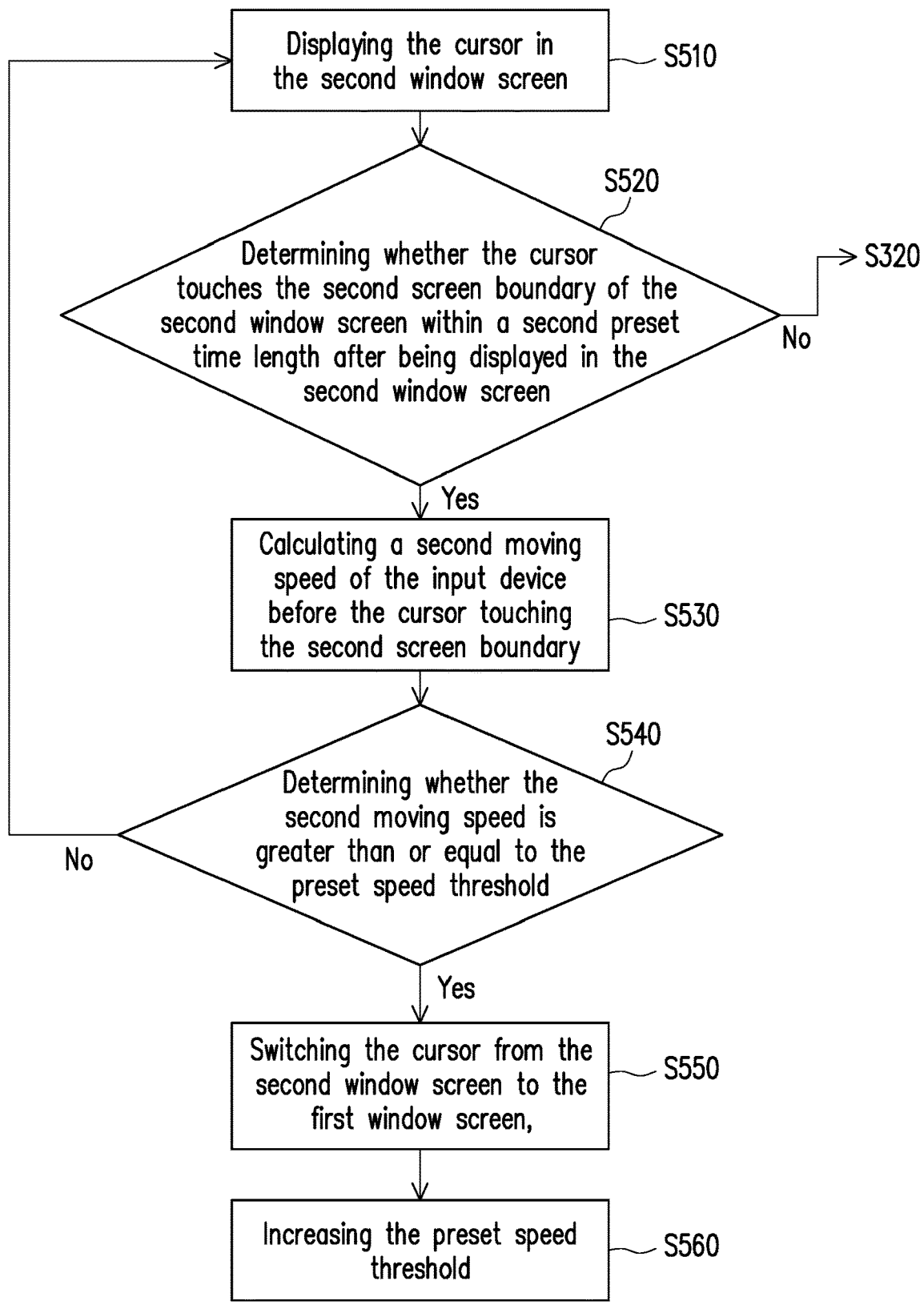
FIG. 5 is a flowchart of a multi-window false switching determination according to an embodiment of the invention.
Figure 6:
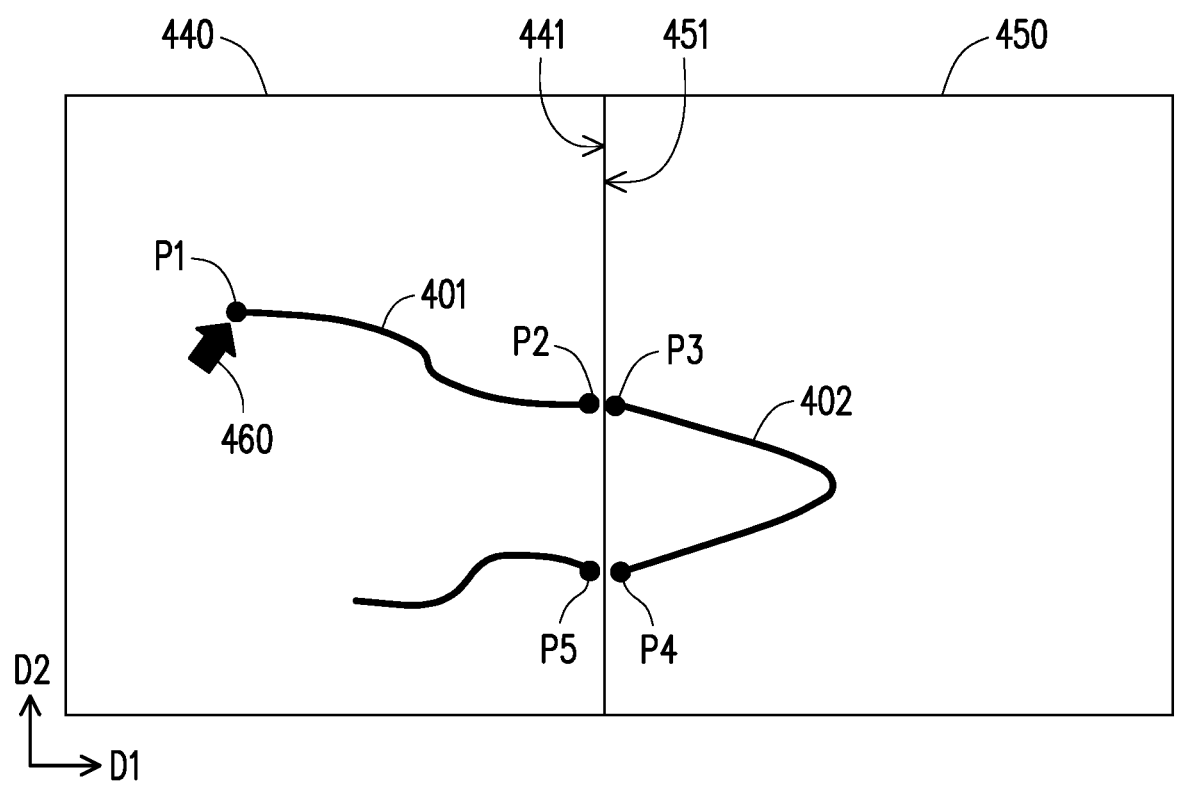
FIG. 6 is an exemplary schematic diagram for switching a cursor displayed in a multi-window screen in the embodiment of FIG. 5 of the invention.

However, in another embodiment, the switch device 110 may also calculate a moving speed (including both the moving speeds in the first direction and the second direction) of the input device 120 along a movement trace within the first preset time, rather than being limited to the above-mentioned way of using only the moving speed in the first direction or the second direction as the basis for switching. It should be noted that, the above two modified embodiments of FIG. 4A and FIG. 4B may also be analogized to the changes and extensions of the following embodiments. FIG. 5 is a flowchart of a multi-window false switching determination according to an embodiment of the invention. FIG. 6 is an exemplary schematic diagram for switching a cursor displayed in a multi-window screen in the embodiment of FIG. 5 of the invention. Referring to FIG. 1, FIG. 5 and FIG. 6, the multi-window switching method of this embodiment may continue after step S360 of the foregoing embodiment of FIG. 3 to achieve a function of further determining whether the screen is switched by mistake. In step S510, the display device 130 displays the cursor 460 in the second window screen 450, and receives the control signal continuously provided by the input device 120. In step S520, the switch device 110 determines whether the cursor 460 touches the second screen boundary 451 of the second window screen 450 within a second preset time length after being displayed in the second window screen 450. If not, the switch device 110 jumps out of the determination flow of FIG. 5 and re-executes step S320 in the embodiment of FIG. 3 described above. If yes, the switch device 110 executes step S530. For example, as shown in FIG. 6, the cursor 460 is moved starting from the position P3, and then the cursor 460 is moved again to be next to a position P4 of the second screen boundary 451 along a trace 402 in response to the input device 120 controlled or moved by the user.

In step S530, the switch device 110 calculates a second moving speed of the input device 120 before the cursor 460' touching the second screen boundary 451. In this embodiment, the second moving speed is a second amount of movement of the input device 120 in the first direction within the first preset time length divided by the first preset time length. In step S540, the switch device 110 determines whether the second moving speed is greater than or equal to the preset speed threshold. If not, the display device 130 continues to execute step S510, so as to display the cursor 460 in the second window screen 450. If yes, the switch device 110 executes step S550. In step S550, the switch device 110 switches the cursor 460 from the second window screen 450 to the first window screen 440. In this embodiment, the switch device 110 switches the input device 120 from the second computer device 150 to be connected to the first computer device 140. For example, as shown in FIG. 6, the cursor 460 is switched to be displayed on a position P5 of the first screen boundary 441 of the first window screen 440, so that the cursor 460 may continue to be correspondingly moved in the first window screen 440 in response to the input device 120 moved or controlled by the user.

Lastly, in step S560, the switch device 110 increases the preset speed threshold. In other words, the switch device 110 of this embodiment may preset a second preset time length that is a shorter time length to determine whether the user wishes to quickly move the cursor 460 back to the first window screen 440. If the user quickly moves the cursor 460 back to the first window screen 440, it means that the user does not actually wish to switch to operate in the second window screen 450. However, because the threshold of the switching is too low, the switching is easy to occur (i.e., the false switching). Here, the preset speed threshold is increased to reduce the occurrence of the false switching. Accordingly, the multi-window switching method of this embodiment may further provide a switching sensitivity adjustment function for an automatic cursor display switching, so as to provide better user experience.

It should be noted that, the preset speed threshold in this embodiment may also have an upper limit value Vth1, which may, for example, satisfy Equation (2) below, wherein W is the number of pixels in the horizontal direction D1 of the window screen. In this regard, the upper limit value Vth1 may be, for example, a distance equal to one-half of the number of pixels in the horizontal direction D1 of the window screen by which the cursor 460 is moved within 0.1 second and touches the first screen boundary 441. In other words, the switch device 110 may, for example, increase the preset speed threshold in a fixed increment starting from the initial speed threshold Vth0 of the Equation (1) above. Moreover, if the preset speed threshold is increased to be equal to the upper limit value Vth1, the switch device 110 will stop increasing the preset speed threshold.

$$Vth1=(w\times(\tfrac{1}{2}))/0.1 \quad\quad \text{Equation (2)}$$

However, the switch device 110 may also increase the preset speed threshold by gradually increasing a magnification for increasing (magnification accumulation) to speed up the switching sensitivity adjustment, so that the screen cursor switching function of the switch device 110 may quickly adapt to user habits. For example, when the switch device 110 determines that the false switching occurs for the first time, the switch device 110 increases the preset speed threshold by v1(Vth0+v1). When the false switching occurs for the second time, the switch device 110 increases the preset speed threshold again by 2×v1(Vth0+v1+2×v1), for example. By analogy, until the preset speed threshold is increased to be equal to the upper limit value Vth1, the switch device 110 will stop increasing the preset speed threshold.

Further, in another embodiment, in the process of increasing the preset speed threshold, when the cursor 460 does not touch the first screen boundary 441 and the second screen boundary 451 for more than a fourth preset time length, the switch device 120 may reset the preset speed threshold to the initial speed threshold Vth0 of Equation (1) above. Alternatively, when the cursor 460 continuously touches a screen boundary not adjacent to other window screens in the first window screen 440 or the second window screen 450, the switch device 110 resets the preset speed threshold. Alternatively, in response to a reset button being triggered, the switch device 110 may reset the preset speed threshold. Here, the reset button may be a physical button or a virtual button.

Figure 7:
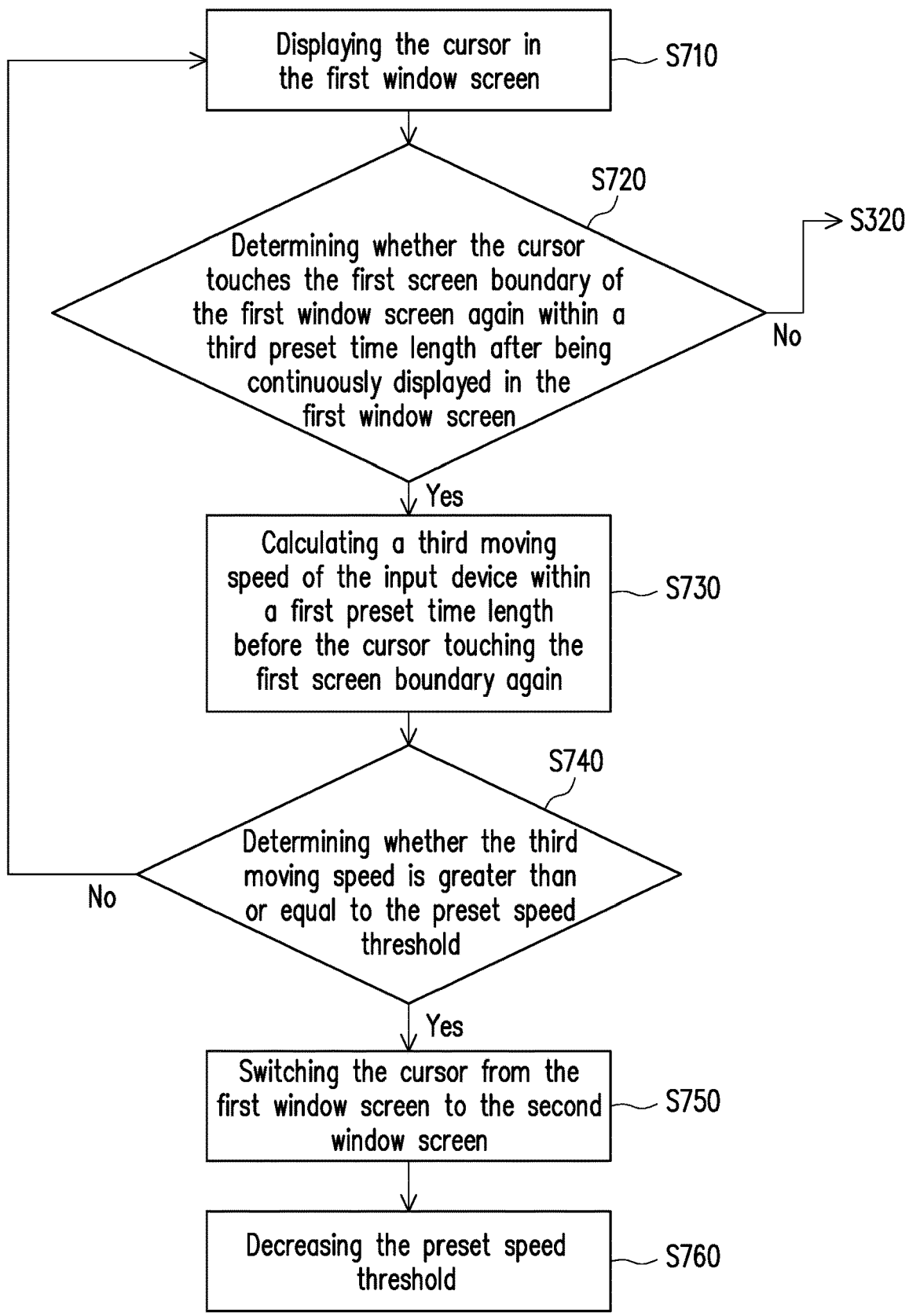
FIG. 7 is a flowchart of a multi-window false blocking determination according to an embodiment of the invention.
Figure 8:
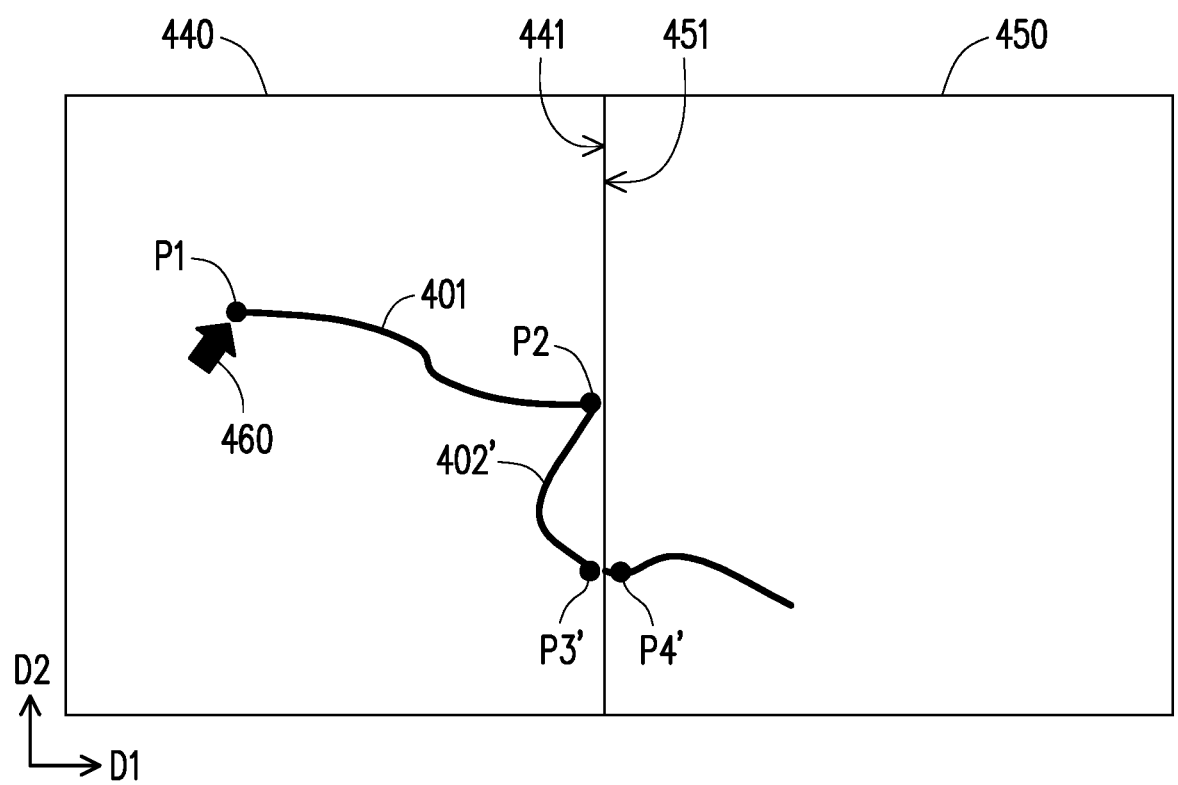
FIG. 8 is an exemplary schematic diagram for switching a cursor displayed in a multi-window screen in the embodiment of FIG. 7 of the invention.

FIG. 7 is a flowchart of a multi-window false blocking determination according to an embodiment of the invention FIG. 8 is an exemplary schematic diagram for switching a cursor displayed in a multi-window screen in the embodiment of FIG. 7 of the invention. Referring to FIG. 1, FIG. 7 and FIG. 8, the multi-window switching method of this embodiment can continue after step S360 of the foregoing embodiment of FIG. 3 (in which the first moving speed is not greater than or equal to the preset speed threshold is determined) to achieve a function of further determining whether the switching of the screen is blocked by mistake. This embodiment is a first form of the false blocking. In step S710, since the switch device 110 does not perform the switching, the display device 130 displays the cursor 460 in the first window screen 440. In step S720, the switch device 110 determines whether the cursor 460 touches the first screen boundary 441 of the first window screen 440 again within a third preset time length after being continuously displayed in the first window screen 440. For example, as shown in FIG. 7, the cursor 460 touches the first screen boundary 441 for the first time at the position P2, and then the cursor 460 is moved again to leave the first screen boundary 441 along a trace 402' and moved to be next to a position P3' of the first screen boundary 441 again in response to the input device 120 controlled or moved by the user.

In this regard, if not, the switch device 110 jumps out of the determination flow of FIG. 7 and re-executes step S320 in the embodiment of FIG. 3 described above. If yes, the switch device 110 executes step S730. In step S730, the switch device 110 calculates a third moving speed of the input device 120 within the first preset time length before the cursor touching the first screen boundary 441 again (e.g., the cursor 460 touches the first screen boundary 441 at the position P3' for the second time). In this embodiment, the third moving speed is a third amount of movement of the input device 120 in the first direction within the first preset time length divided by the first preset time length. In step S740, the switch device 110 determines whether the third moving speed is greater than or equal to the preset speed threshold. If not, the switch device 110 re-executes step S710. If yes, the switch device 110 executes step S750. In step S750, the switch device 110 switches the cursor 460 from the first window screen 440 to the second window screen 450. For example, as shown in FIG. 8, the cursor 460 is switched to be displayed on a position P4' of the second screen boundary 451 of the second window screen 450, so that the cursor 460 may continue to be correspondingly moved in the second window screen 450 in response to the input device 120 moved or controlled by the user.

Lastly, in step S760, the switch device 110 decreases the preset speed threshold. In other words, the switch device 110 of this embodiment may preset a second preset time length that is a shorter time length to determine whether the user wishes to quickly make the cursor 460 touching the first screen boundary 441 of the first window screen 440 at least twice. If the user quickly moves the cursor 460 from the first window screen 440 to the second window screen 450 again, it means that the user actually wishes to switch to operate in the second window screen 450. However, because the threshold of the switching is too high, the switching is unsuccessful (i.e., the false blocking). Here, the preset speed threshold is decreased to reduce the occurrence of the false blocking. Accordingly, the multi-window switching method of this embodiment may further provide a switching sensitivity adjustment function for an automatic cursor display switching, so as to provide better user experience.

It should be noted that, the preset speed threshold in this embodiment may also have a lower limit value Vth2, which may, for example, satisfy Equation (3) below, wherein W is the number of pixels in the horizontal direction D1 of the window screen. In this regard, the lower limit value Vth2 may be, for example, a distance equal to one-twentieth of the number of pixels in the horizontal direction D1 of the window screen by which the cursor 460 is moved within 0.1 second and touches the first screen boundary 441. In other words, the switch device 110 may, for example, decrease the preset speed threshold in a fixed decrement starting from the initial speed threshold Vth0 of the Equation (1) above. Moreover, if the preset speed threshold is decreased to be equal to the lower limit value Vth2, the switch device 110 will stop decreasing the preset speed threshold.

$$Vth2=(W\times(1/20))/0.1 \qquad \text{Equation (3)}$$

However, the switch device 110 may also decrease the preset speed threshold by gradually increasing a magnification for decreasing (magnification accumulation) to speed up the switching sensitivity adjustment, so that the screen cursor switching function of the switch device 110 may quickly adapt to user habits. For example, when the switch device 110 determines that the false blocking occurs for the first time, the switch device 110 decreases the preset speed threshold by v2(Vth0−v2), for example. When the false blocking occurs for the second time, the switch device 110 decreases the preset speed threshold again by 2×v2(Vth0−v2−2×v2), for example. By analogy, until the preset speed threshold is decreased to be equal to the lower limit value Vth2, the switch device 110 will stop decreasing the preset speed threshold.

Further, in another embodiment, in the process of decreasing the preset speed threshold, when the cursor 460 does not touch the first screen boundary 441 and the second screen boundary 451 for more than a fourth preset time length, the switch device 120 may reset the preset speed threshold to the initial speed threshold Vth0 of Equation (1) above. Alternatively, when the cursor 460 continuously touches a screen boundary not adjacent to other window screens in the first window screen 440 or the second window screen 450, the switch device 110 resets the preset speed threshold Alternatively, in response to a reset button being triggered, the switch device 110 may reset the preset speed threshold. Here, the reset button may be a physical button or a virtual button.

Figure 9:
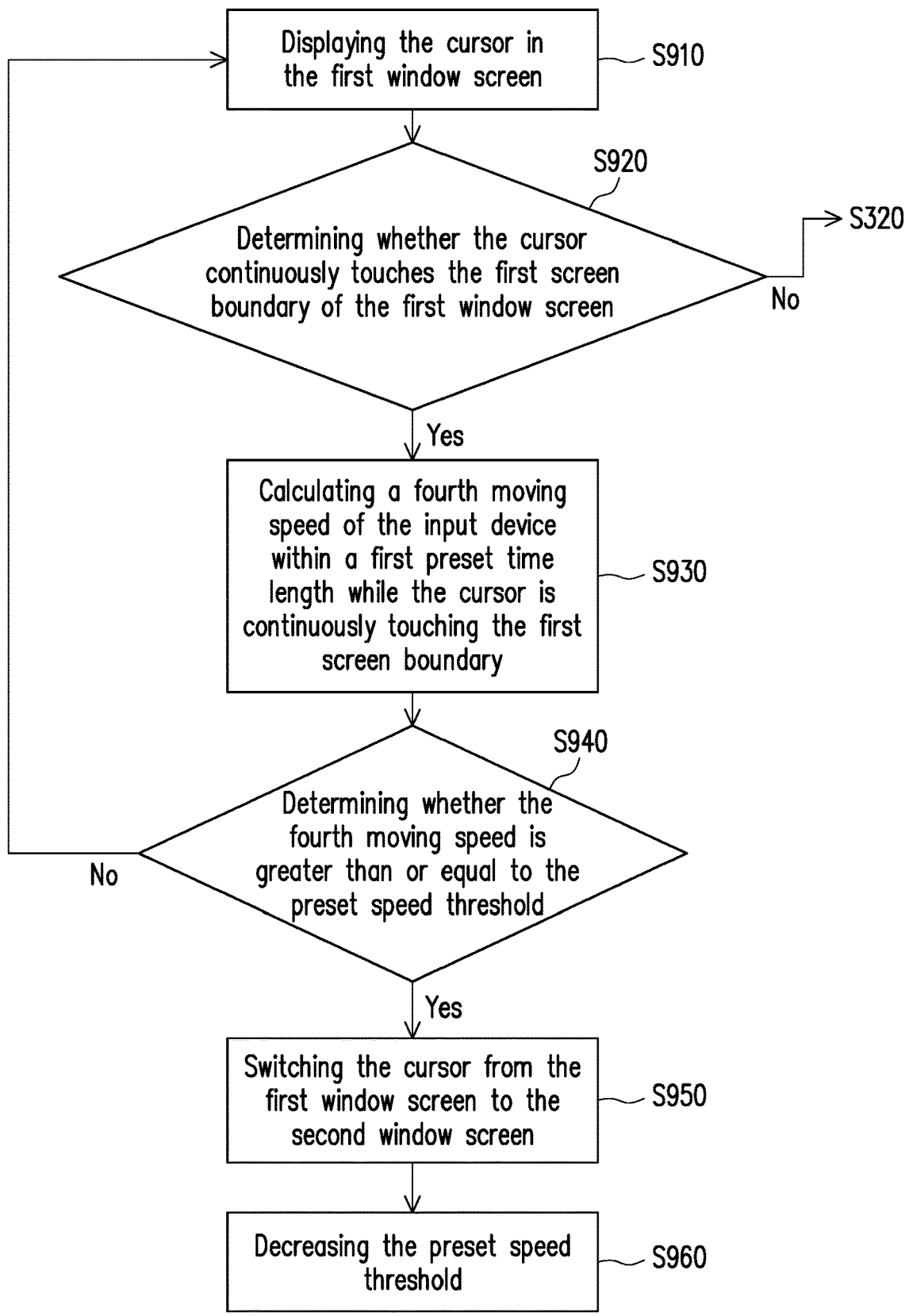
FIG. 9 is a flowchart of a multi-window false blocking determination according to another embodiment of the invention.
Figure 10:
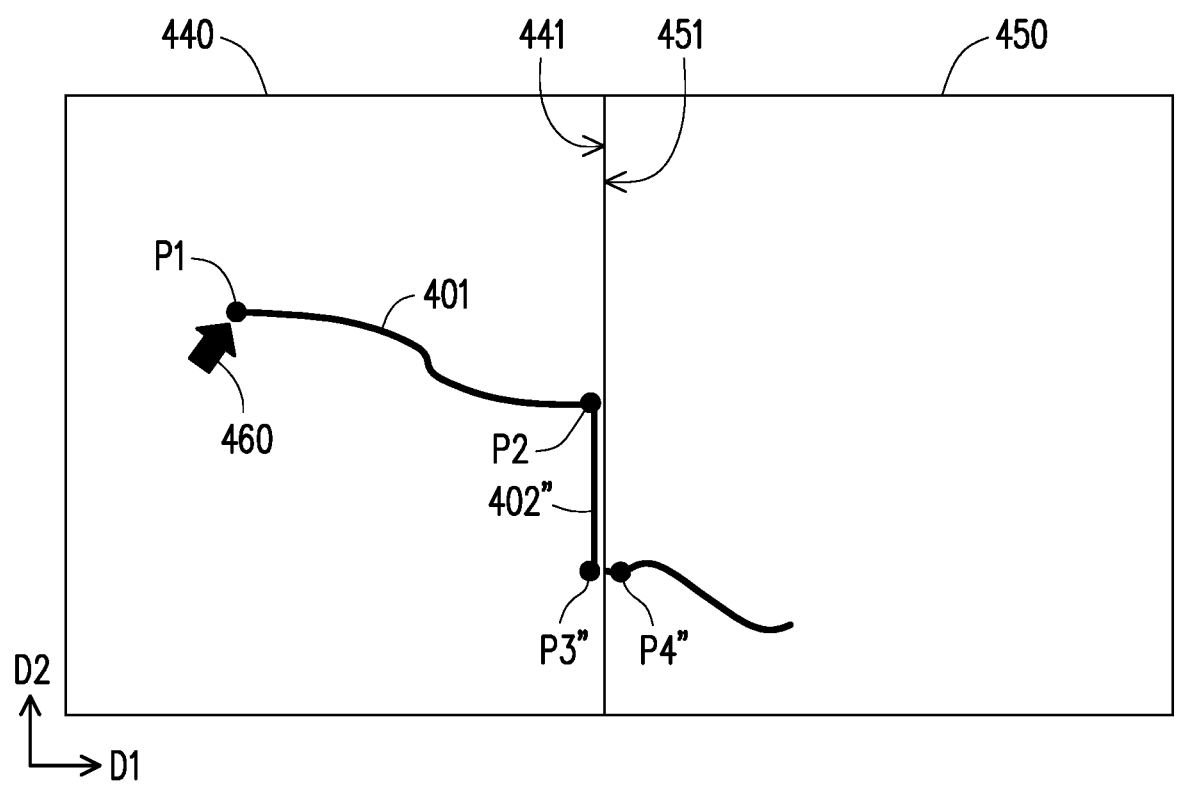
FIG. 10 is an exemplary schematic diagram for switching a cursor displayed in a multi-window screen in the embodiment of FIG. 9 of the invention.

FIG. 9 is a flowchart of a multi-window false blocking determination according to another embodiment of the invention. FIG. 10 is an exemplary schematic diagram for switching a cursor displayed in a multi-window screen in the embodiment of FIG. 9 of the invention. Referring to FIG. 1, FIG. 9 and FIG. 10, the multi-window switching method of this embodiment can continue after step S360 of the foregoing embodiment of FIG. 3 (in which the first moving speed is not greater than or equal to the preset speed threshold is determined) to achieve a function of further determining whether the switching of the screen is blocked by mistake. This embodiment is a second form of the false blocking. In step S910, since the switch device 110 does not perform the switching, the display device 130 displays the cursor 460 in the first window screen 440. In step S920, the switch device 110 determines whether the cursor 460 continuously touches the first screen boundary 441 of the first window screen 440. For example, as shown in FIG. 10, the cursor 460 touches the first screen boundary 441 at the position P2 for the first time, and then the cursor 460 continuously stays on the first screen boundary 441 or is moved along the first screen boundary 441 (e.g., a trace 402") without leaving the first screen boundary 441 in response to the input device 120 controlled or moved by the user. Further, the input device 120 may still continue to be moved or controlled by the user in the first direction.

In this regard, if not, the switch device 110 jumps out of the determination flow of FIG. 9 and re-executes step S320 in the embodiment of FIG. 3 described above. If yes, the switch device 110 executes step S930. In step S930, the switch device 110 calculates a fourth moving speed of the input device 120 within the first preset time length while the cursor 460 is continuously touching the first screen boundary 441 (e.g., the cursor 460 continuously touches the first screen boundary 411 and is moved from the position P2 to a position P3"). In this embodiment, the fourth moving speed is a fourth amount of movement of the input device 120 in the first direction within the first preset time length after the cursor 460 touching the first screen boundary 441 divided by the first preset time length. In step S940, the switch device 110 determines whether the fourth moving speed is greater than or equal to the preset speed threshold. If not, the switch device 110 re-executes step S910. If yes, the switch device 110 executes step S950. In step S950, the switch device 110 switches the cursor 460 from the first window screen 440 to the second window screen 450. For example, as shown in FIG. 10, the cursor 460 is switched to be displayed on a position P4" of the second screen boundary 451 of the second window screen 450, so that the cursor 460 may be correspondingly moved in the second window screen 450 in response to the input device 120 moved or controlled by the user.

Lastly, in step S960, the switch device 110 decreases the preset speed threshold. In other words, the switch device 110 of this embodiment may determine whether the user is actually wishing to move the cursor 460 to the second window screen 450 and continuously move the input device 120 in the first direction. If the user continuously moves the input device 120 in the first direction after the cursor 460 touching the first screen boundary 441 of the first window screen 440, it means that it was not switched from the first window screen 440 to the second window screen 450 the last time. In this embodiment, it is assumed that the user actually wishes to switch to operate in the second window screen 450. However, because the threshold of the switching is too high, the switching is unsuccessful (i.e., the false blocking). Here, the preset speed threshold is decreased to reduce the occurrence of the false blocking. Accordingly, the multi-window switching method of this embodiment may further provide a switching sensitivity adjustment function for an automatic cursor display switching, so as to provide better user experience.

It should be noted that, enough teaching, suggestion, and instruction regarding the lower limit value of the preset speed threshold, a decreasing method of the preset speed threshold and a resetting method of the preset speed threshold of this embodiment may be obtained according to related descriptions in the foregoing embodiment of FIG. 7, which are not repeated hereinafter.

In summary, the multi-window switching method and the switching system of the invention provide a way to conditionally switch between computer systems, and can determine whether to display the cursor in another window screen in real time based on the moving speed before the cursor touching the boundary in the currently displayed window screen. Moreover, the multi-window switching method and the switching system of the of the invention may also perform the false switching determination and the false blocking determination, so as to automatically adjust the speed threshold for switching between the computer system to provide an adaptive switching judgment adjustment effect. Accordingly, the switching system can automatically adapt the usage habits of different users and provide better user experience.

In order to make content of the invention more comprehensible, embodiments are described below as the examples to prove that the invention can actually be realized. Moreover, elements/components/steps with same reference numerals represent same or similar parts in the drawings and embodiments.

The invention claimed is:

1. A multi-window switching method, comprising:
   displaying a first window screen provided via a first computer device and a second window screen provided via a second computer device, wherein a first screen boundary of the first window screen is adjacent to a second screen boundary of the second window screen;
   receiving a control signal provided by an input device to control a position of a cursor on the first window screen or the second window screen;
   calculating a first moving speed of the input device when the cursor touches the first screen boundary in the first window screen;
   determining whether the first moving speed is greater than or equal to a preset speed threshold to decide whether to display the cursor in the second window screen,
   when the cursor is switched from the first window screen to the second window screen, calculating a second moving speed of the input device when the cursor touches the second screen boundary of the second window screen within a second preset time length after being displayed in the second window screen, and increasing the preset speed threshold when the second moving speed is greater than or equal to the preset speed threshold; or
   when the cursor is continuously displayed in the first window screen, calculating a third moving speed of the input device when the cursor touches the first screen boundary of the first window screen again within a third preset time length after being continuously displayed in the first window screen, and decreasing the preset speed threshold when the third moving speed is greater than or equal to the preset speed threshold.

2. The multi-window switching method of claim 1, wherein the first moving speed is a first amount of movement of the input device in a first direction within a first preset time length divided by the first preset time length.

3. The multi-window switching method of claim 1, further comprising:
   switching the cursor from the first window screen to the second window screen when the first moving speed is greater than or equal to the preset speed threshold.

4. The multi-window switching method of claim 3, wherein when the cursor is switched from the first window screen to the second window screen, the multi-window switching method comprises:
   determining whether the second moving speed is greater than or equal to the preset speed threshold; and
   switching the cursor from the second window screen to the first window screen when the second moving speed is greater than or equal to the preset speed threshold.

5. The multi-window switching method of claim 4, wherein the second moving speed is a second amount of movement of the input device in a first direction within a first preset time length divided by the first preset time length.

6. The multi-window switching method of claim 1, further comprising:
   when the first moving speed is less than the preset speed threshold, continuously displaying the cursor in the first window screen.

7. The multi-window switching method of claim 6, wherein after the cursor is continuously displayed in the first window screen, the multi-window switching method further comprises:
   determining whether the third moving speed is greater than or equal to the preset speed threshold; and
   switching the cursor from the first window screen to the second window screen when the third moving speed is greater than or equal to the preset speed threshold.

8. The multi-window switching method of claim 7, wherein the third moving speed is a third amount of movement of the input device in a first direction within a first preset time length divided by the first preset time length.

9. The multi-window switching method of claim 1, further comprising:
   resetting the preset speed threshold to an initial speed threshold when the cursor does not touch the first screen boundary or the second screen boundary for more than a fourth preset time length.

10. The multi-window switching method of claim 1, further comprising:
    resetting the preset speed threshold to an initial speed threshold when the cursor continuously touches a screen boundary not adjacent to other window screens in the first window screen or the second window screen.

11. The multi-window switching method of claim 1, further comprising:
    resetting the preset speed threshold to an initial speed threshold in response to a reset button being triggered.

12. A switching system, comprising:
    a switch device comprising a processor;
    at least one display device, coupled to the switch device, and at least comprising a first window screen and a second window screen, wherein the at least one display device is a display;

a first computer device, coupled to the switch device, and providing first display data to the first window screen of the display device via the switch device, wherein the first computer device is a computer;

a second computer device, coupled to the switch device, and providing second display data to the second window screen of the display device via the switch device, wherein a first screen boundary of the first window screen is adjacent to a second screen boundary of the second window screen, wherein the second computer device is a computer; and an input device, coupled to the switch device, and providing a control signal via the switch device to control a position of a cursor on the display device, wherein the input device is an input/output (I/O) interface, wherein when the processor of the switch device determines that the cursor touches the first screen boundary in the first window screen, the switch device calculates a first moving speed of the input device, and the switch device determines whether the first moving speed is greater than or equal to a preset speed threshold to decide whether to switch the cursor from the first window screen to the second window screen, wherein when the cursor is switched from the first window screen to the second window screen, the switch device calculates a second moving speed of the input device when the cursor touches the second screen boundary of the second window screen within a second preset time length after being displayed in the second window screen, and the switch device increases the preset speed threshold when the second moving speed is greater than or equal to the preset speed threshold; or wherein when the cursor is continuously displayed in the first window screen, the switch device calculates a third moving speed of the input device when the cursor touches the first screen boundary of the first window screen again within a third preset time length after being continuously displayed in the first window screen, and the switch device decreases the preset speed threshold when the third moving speed is greater than or equal to the preset speed threshold.

13. The switching system of claim 12, wherein when the first moving speed is greater than or equal to the preset speed threshold, the switch device switches the first computer device correspondingly controlled by the input device to the second computer device so that the cursor is displayed in the second window screen.

14. The switching system of claim 13, wherein when the cursor touches the second screen boundary of the second window screen within the second preset time length after being displayed in the second window screen, the switch device determines whether the second moving speed is greater or equal to than the preset speed threshold, when the second moving speed is greater than or equal to the preset speed threshold, the switch device switches the second computer device correspondingly controlled by the input device to the first computer device so that the cursor is displayed in the first window screen.

15. The switching system of claim 12, wherein when the first moving speed is less than the preset speed threshold, the input device controls the first computer device to continuously display the cursor in the first window screen.

16. The switching system of claim 15, wherein when the cursor touches the first screen boundary of the first window screen again within the third preset time length after being continuously displayed in the first window screen, the switch device calculates the third moving speed of the input device within a first preset time length, and the switch device determines whether the third moving speed is greater than or equal to the preset speed threshold, wherein when the third moving speed is greater than or equal to the preset speed threshold, the switch device switches the first computer device correspondingly controlled by the input device to the second computer device so that the cursor is displayed in the second window screen.

17. The switching system of claim 15, wherein when the cursor is continuously located on the first screen boundary, the switch device calculates a fourth moving speed of the input device within a first preset time length while the cursor is continuously touching the first screen boundary, and the switch device determines whether the fourth moving speed is greater than or equal to the preset time length, wherein when the fourth moving speed is greater than or equal to the preset speed threshold, the switch device switches the input device corresponding to the cursor from the first computer device to be connected to the second computer device so as to display the cursor in the second window screen, and the switch device decreases the preset speed threshold.

18. The switching system of claim 12, wherein when the cursor does not touch the first screen boundary and the second screen boundary for more than a fourth preset time length, the switch device resets the preset speed threshold to an initial speed threshold.

19. The switching system of claim 12, wherein when the cursor continuously touches a screen boundary not adjacent to other window screens in the first window screen or the second window screen, the switch device resets the preset speed threshold to an initial speed threshold.

20. The switching system of claim 12, wherein in response to a reset button being triggered, the switch device resets the preset speed threshold to an initial speed threshold.

* * * * *